(12) United States Patent
Nagel et al.

(10) Patent No.: US 8,925,198 B2
(45) Date of Patent: Jan. 6, 2015

(54) METHOD AND MACHINING INSTALLATION FOR THE FINISHING OF A CRANKSHAFT BEARING BORE

(75) Inventors: Bernd Nagel, Nuertingen (DE); Martin Mayer, Frickenhausen (DE); German Wankmiller, Ronsberg (DE); Georg Wassermann, Lauben (DE)

(73) Assignees: Nagel Maschinen-und Werkzeugfabrik GmbH, Germany (DE); Grob-Werke GmbH & Co. KG, Germany (DE)

( * ) Notice: Subject to any disclaimer, the term of this patent is extended or adjusted under 35 U.S.C. 154(b) by 132 days.

(21) Appl. No.: 13/557,672

(22) Filed: Jul. 25, 2012

(65) Prior Publication Data
US 2013/0025124 A1    Jan. 31, 2013

(30) Foreign Application Priority Data
Jul. 27, 2011   (DE) .......................... 10 2011 079 900

(51) Int. Cl.
*B23P 9/00*    (2006.01)
*B24B 33/02*   (2006.01)
*B23B 41/12*   (2006.01)

(52) U.S. Cl.
CPC ............... *B24B 33/022* (2013.01); *B23B 41/12* (2013.01)
USPC ....... 29/888.06; 29/888.01; 29/56.5; 408/1 R; 409/131; 451/51

(58) Field of Classification Search
USPC ....... 29/888.01, 56.5, 56.6; 408/1 R, 24, 158, 408/224; 409/131; 451/1, 5, 8, 25, 27, 51, 451/61, 155, 156, 461
See application file for complete search history.

(56) References Cited

U.S. PATENT DOCUMENTS 5,095,662 A * 3/1992 Grimm et al. ...................... 451/5
5,221,165 A * 6/1993 Goszczynski ................. 408/1 R (Continued)

FOREIGN PATENT DOCUMENTS

DE    43 03 526 A1    8/1994
DE    19634415 A1     2/1998

(Continued)

OTHER PUBLICATIONS

European Search Report issued in connection with EP12177643 dated Jan. 23, 2014.

(Continued)

*Primary Examiner* — Alexander P Taousakis
(74) *Attorney, Agent, or Firm* — Akerman LLP

(57) ABSTRACT

In a method for the finishing of a crankshaft bearing bore in a cylinder crankcase of an internal combustion engine, starting from a prepared crankshaft bearing bore, a finished crankshaft bearing bore is produced with a prescribable desired size, a prescribable desired structure of the bore inner surface and a prescribable desired position of the bore axis. The prepared crankshaft bearing bore is first finished with at least one finishing tool with a geometrically defined cutting edge and then the honing of the crankshaft bearing bore is carried out. In a final finishing operation with a geometrically defined cutting edge immediately preceding the honing, an allowance of at least 0.4 mm is removed, and the honing tool is introduced into the bore coaxially in relation to the desired position of the bore axis and moved within the bore, an allowance of at least 0.08 mm being removed during the honing.

19 Claims, 6 Drawing Sheets

(56) References Cited

U.S. PATENT DOCUMENTS

| | | | |
|---|---|---|---|
| 6,287,057 B1 | 9/2001 | Kurz | |
| 6,793,560 B2 * | 9/2004 | Weigmann et al. | 451/51 |
| 6,910,945 B2 * | 6/2005 | Suzuki et al. | 451/7 |
| 7,402,097 B2 * | 7/2008 | Esslinger et al. | 451/180 |
| 7,416,475 B2 * | 8/2008 | Blaut et al. | 451/11 |
| 8,287,214 B2 * | 10/2012 | Sadaoka et al. | 408/36 |
| 8,512,095 B2 * | 8/2013 | Nagel et al. | 451/8 |
| 2007/0054605 A1 | 3/2007 | Blaut et al. | |
| 2011/0027028 A1 * | 2/2011 | Sadaoka et al. | 408/1 R |
| 2012/0184182 A1 * | 7/2012 | Mayer et al. | 451/5 |
| 2013/0199507 A1 * | 8/2013 | Taenzer et al. | 123/572 |

FOREIGN PATENT DOCUMENTS

| | | |
|---|---|---|
| DE | 102010010901 A1 | 9/2011 |
| EP | 0968069 A1 | 1/2000 |
| EP | 1932620 A1 | 6/2008 |
| GB | 544 377 A | 4/1942 |

OTHER PUBLICATIONS

German Office Action dated May 31, 2012 issued in connection with corresponding German Patent Application No. 10 2011 079 900.1.

* cited by examiner

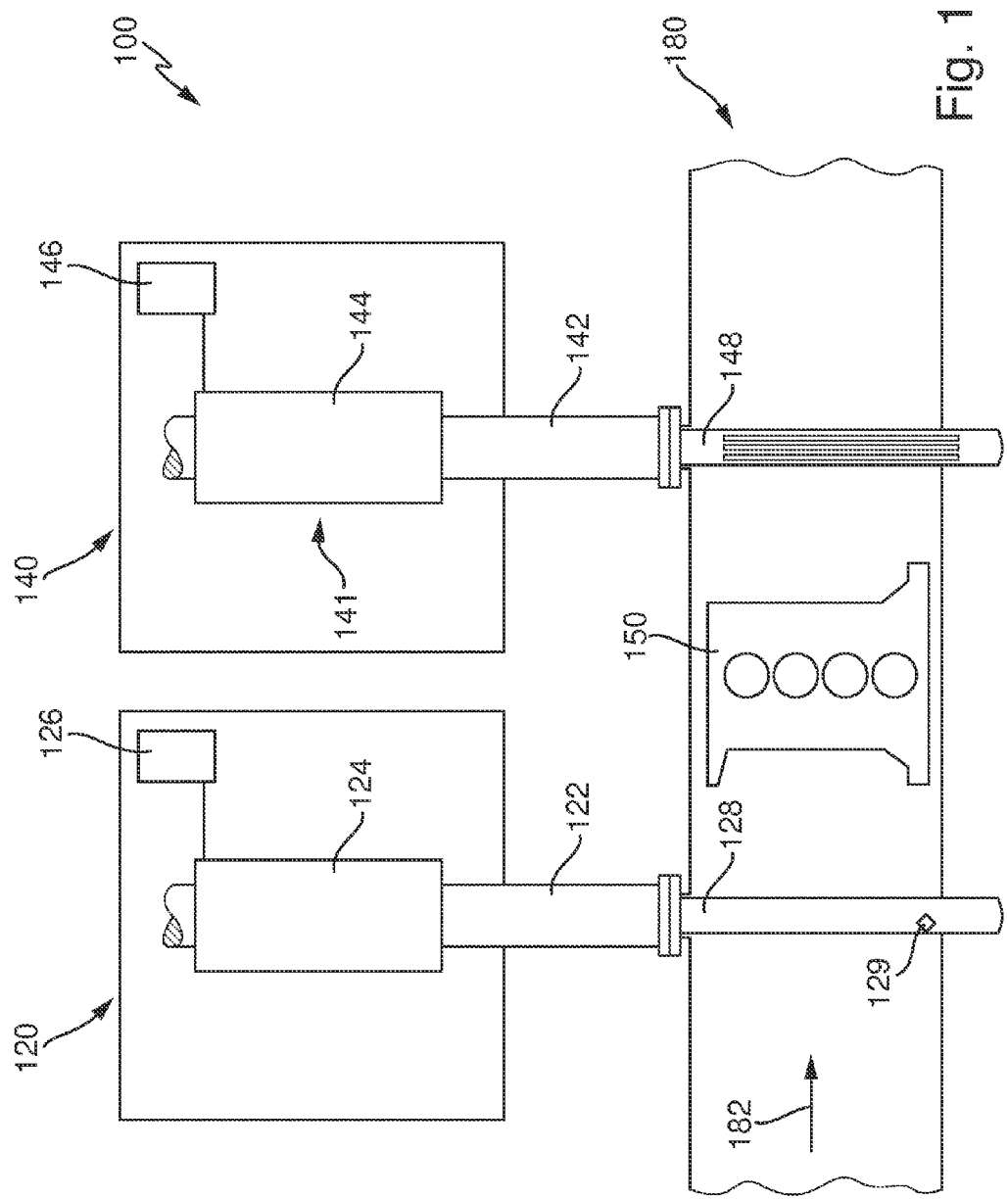

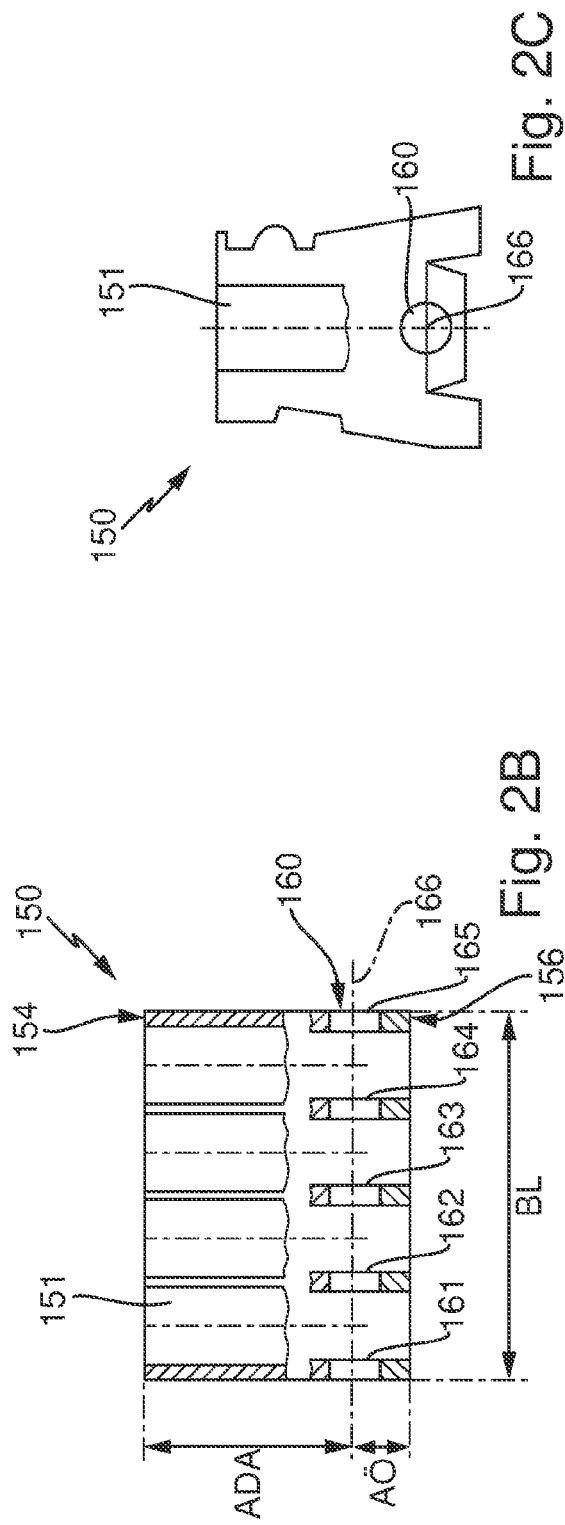

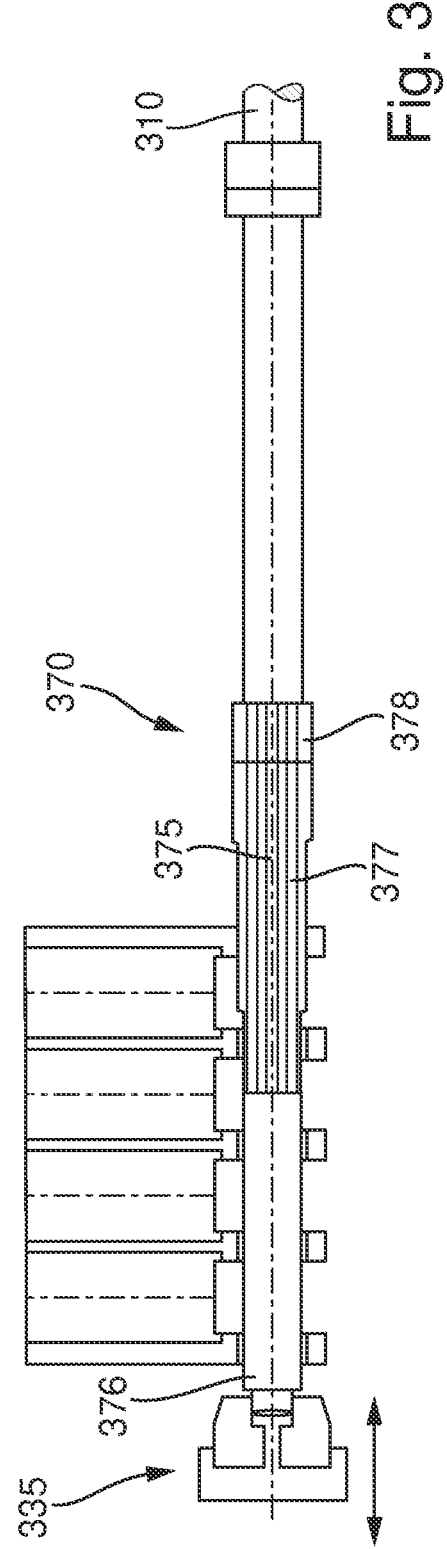

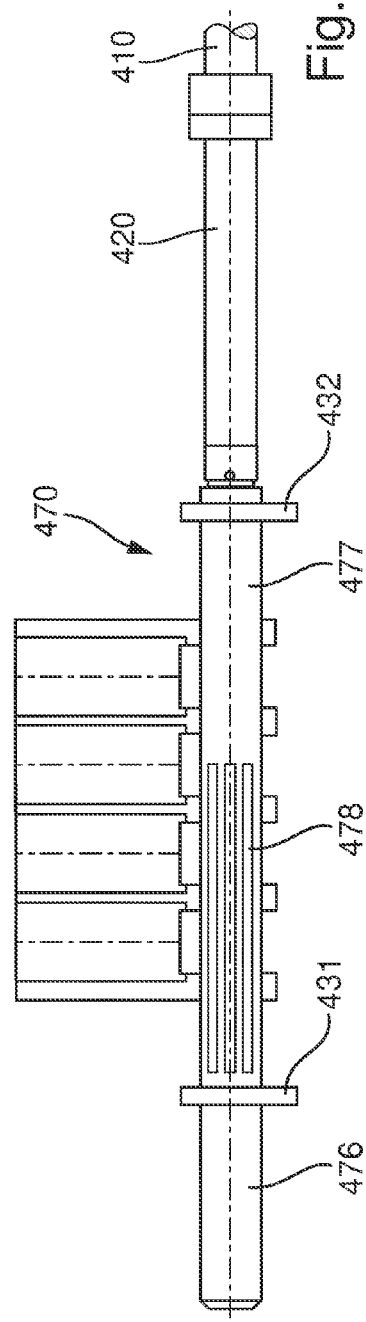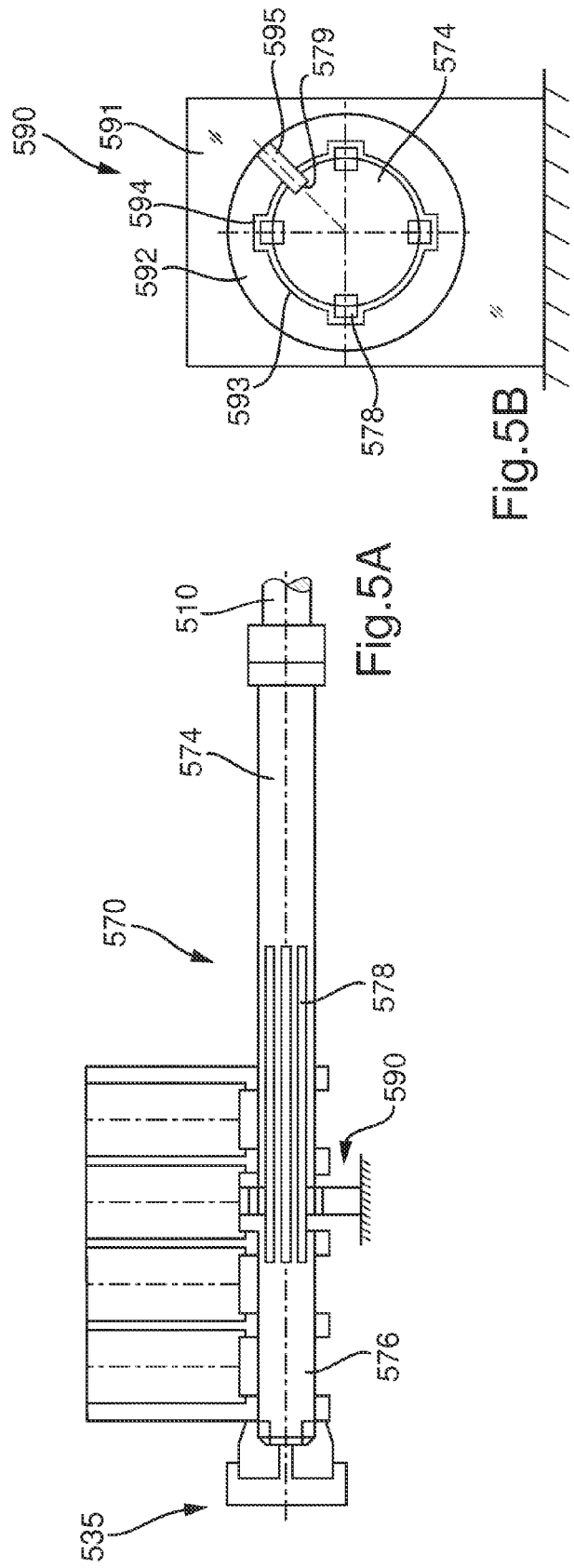

METHOD AND MACHINING INSTALLATION FOR THE FINISHING OF A CRANKSHAFT BEARING BORE

CROSS-REFERENCE TO RELATED APPLICATIONS

The present application claims priority to German Patent Application No. 10 2011 079 900.1, filed Jul. 27, 2011, the entirety of which is incorporated herein by reference.

BACKGROUND AND PRIOR ART

The invention relates to a method for the finishing of a crankshaft bearing bore in a cylinder crankcase of an internal combustion engine. The invention also relates to a machining installation suitable for carrying out the method.

The cylinder crankcase, which is often also referred to simply as the "crankcase" or "engine block", is an integral part of combustion engines or internal combustion engines, as are used for example in passenger cars or trucks, aircraft, ships or stationary installations. The most widely encountered design is that of multi-cylinder engines, the pistons of which are connected by means of connecting rods to the rotating crankshaft, which passes on the power generated by the engine to wheels, propellers, generators or the like.

The crankshaft lies below the cylinders in in-line or V-type engines and between the cylinders in opposed-cylinder engines, and is supported on the cylinder crankcase at the bearing points of the crankshaft bearing bore. The bearing points generally take the form of plain bearings, sometimes also antifriction bearings. In order to ensure a high degree of concentricity of the crankshaft, and consequently to minimize undesired effects of wear and vibrations during operation, the crankshaft must meet high dimensional tolerance requirements. The bearing points also have close tolerances with regard to their size and position in the cylinder crankcase.

The relatively close tolerances of the important parts of an internal combustion engine and of a cylinder crankcase are a result of the complex functions of these parts. The shape, size and surface topography of the cylinder bore thereby crucially determine the amount of wear, the friction and the oil consumption and emission values of the combustion engine and, as a result of the friction, also the output and efficiency. The compressed combustion-chamber volume particularly determines the compression of the engine. This has effects on the output and, by the combustion sequence, also an influence on the emission values and on engine noises.

Among other reasons, the exact position of the crankshaft in relation to the pistons or the cylinder bores is important for reducing wear on the engine parts that are subjected to high loading. These are, in particular, pistons/piston pins, connecting rods and bearings of the connecting rod on the crankshaft and also the mounting of the crankshaft in the cylinder crankcase. As far as the position of the bore axis is concerned, not only the absolute spatial position but also the angular position or orientation thereof play a part. For example, in the case of manual transmissions with a clutch, the crankshaft and the input shaft of the transmission run with each other. Therefore, a coaxiality of the two shafts is decisive here for a long service life.

As far as the crankshaft mounting is concerned, the coaxiality of the bearing points in relation to one another is also important. The bearing points should lie in line as well as possible, in order that the crankshaft can run concentrically and rests substantially uniformly at all the bearing points.

The workpiece region around a crankshaft bearing bore is generally made up of two individual parts. These are most frequently the bearing webs of the cylinder crankcase on the one hand and the bearing covers screwed onto them on the other hand. Alternatively, the crankshaft bearing bore may also lie at the interface of two cylinder crankcase halves, such as for example in the case of the opposed-cylinder engine. The individual parts are generally pre-machined in the unfitted state, in that half-round surface portions are respectively produced on the bearing webs of the cylinder crankcase and on the bearing covers. In a subsequent process step, the individual parts are screwed together, so that a substantially cylindrical bore portion is respectively obtained from the half-round surface portions in the region of a bearing point. A number of bore portions lying spaced apart one behind the other in series then provide the overall crankshaft bearing bore.

The bore prepared in this way is then subjected to a multi-stage finishing. In order to be able to achieve the tolerances in the production of cylinder crankcases, nowadays a combination of one or more drilling operations and/or frictional operations and one or more subsequent honing operations is generally used. The multiplicity of operations are provided because irregularities, for example caused by the casting of the cylinder crankcase, make it necessary for relatively great amounts of material, of several tenths of a millimeter or more, to be removed, but at the same time dimensional and positional tolerances may lie in the lower micrometer range, and consequently require high-precision machining.

The machining stages with the aid of tools with geometrically defined cutting edges (drilling tools or frictional tools) have in this case two main tasks. One task is to establish the position of the overall crankshaft bearing bore with reference to a system of coordinates that is fixed in relation to the workpiece, for example with reference to a corresponding reference surface on the cylinder crankcase. Therefore, by means of finishing with geometrically defined cutting edges, the desired position of the bore axis that is prescribed for the workpiece is produced. The other task of the finishing by means of tools with geometrically defined cutting edges is that of positioning the individual bearing points in relation to one another, which among those skilled in the art is also referred to as the "coaxiality" of the crankshaft bearing bore. The total amounts of material removal with respect to the bore diameter in the case of these operations typically lie in the range of several tenths of a millimeter, sometimes also one millimeter or more.

The finishing by means of tools with geometrically defined cutting edges is followed by a honing of the crankshaft bearing bore, that is to say finishing with a tool or a number of tools with geometrically undefined cutting edges. The honing particularly achieves the required final quality with regard to diameter tolerance, cylindrical shape and surface roughness, so that the tolerances with regard to the prescribable desired size and the prescribable desired structure of the bore inner surface can be maintained.

It is intended that the position and coaxiality of the crankshaft bearing bore should not be changed during the honing, since they have already been established by the preceding operations. Therefore, an articulated or compliant coupling between the honing tool and the honing spindle is provided for the honing, in order that the honing tool can follow the bore that has already been prescribed with regard to its position, without actively changing the position thereof. The amounts of material removal with respect to the bore diameter in the honing operation typically lie in the range of well below 100 μm.

EP 0 968 069 B2 describes a drilling machine which can be used in the mass production of cylinder crankcases for drilling the crankshaft bearing bores.

DE 196 34 415 B4 discloses a honing tool which can be used, for example, when honing crankshaft bearing bores or other bores that are divided into portions and have bore portions arranged in line in series. The honing tool has at least one honing region, which can be set according to the desired size before the beginning of machining and has a cutting region and calibrating region each with at least one cutting coating, and a guiding cutting region with at least one cutting coating, the guiding cutting region being radially expandable.

PROBLEM AND SOLUTION

The invention addresses the problem of providing a method for the finishing of crankshaft bearing bores in cylinder crankcases and a device suitable for carrying out the method, with which crankshaft bearing bores can be finished more cost-effectively than previously while maintaining highest requirements for the machining precision when starting from a relatively rough pre-machining.

In the configuration according to the claimed invention, the machining operations of the multi-stage finishing can work together better than previously. The interface between the different chip-forming machining methods—on the one hand with a geometrically defined cutting edge (for example precision drilling and/or reaming), on the other hand with geometrically undefined cutting edges (honing)—is optimized. The following are among the considerations on which this is based.

The term "honing" refers in this application to a machining process with geometrically undefined cutting edges, in which a honing tool with many cutting edges performs a machining movement comprising two components, which leads to a characteristic surface structure of the machined inner surface, which usually, but not necessarily, has crossing machining traces. The machining movement transferred from a honing spindle of a honing machine to the honing tool generally comprises a reciprocating movement, going axially back and forth, and a rotating movement superimposed on it.

In comparison with tools which work with geometrically defined cutting edges (for example drilling tools), honing tools have a considerably longer lifetime, so that greater numbers of pieces can be machined without changing the tool. While in the case of drilling tools and reaming tools wear of the geometrically defined cutting edges can lead to a gradual changing of the engagement conditions, and consequently a deterioration in the surface quality and dimensional accuracy, the cutting performance of honing tools remains substantially constant during the entire lifetime as a result of the self-sharpening effect of the cutting groups provided with bonded abrasive grains, so that largely consistent qualities of shape and surface microstructure can be achieved even in the case of large numbers of machined workpieces and a relatively high rate of material removal per bore.

Shifting part of the machining task away from precision drilling and/or reaming towards honing can consequently increase the productivity of the overall process without losses in quality.

The invention produces a considerable shortening of the process chain, with the potential for carrying out the finishing much more cost-effectively.

The machining operations by means of geometrically defined cutting edges can work more approximately, but for that more efficiently, than previously. In some cases it may be possible to dispense entirely with individual machining stages by means of geometrically defined cutting edges. For example, in the case of some variants of the method it may be possible to dispense with the so-called finishing precision drilling, which as the final machining operation of a multi-stage, precision drilling process with typical amounts of material removal of between 40 µm and 50 µm (with respect to the bore diameter), was conventionally designed to machine the bore so accurately that the subsequent honing only had to remove very small amounts (typically between 40 µm and 60 µm) to set the diameter tolerance, cylindrical shape and surface structure.

Since the honing can achieve a relatively high amount of material removal, it is less important than in the case of conventional methods that a specific final dimension is maintained within close tolerances by the machining by means of geometrically defined cutting edges. The subsequent honing operation is in this respect "more tolerant". Therefore, there is no need for a measuring operation, customary in the case of conventional methods, after the completion of the final finishing by means of geometrically defined cutting edges or before the beginning of honing, and the workpiece can be honed after the final finishing operation with a geometrically defined cutting edge without first performing a measuring operation. It is also possible to dispense with the corresponding measuring station, and it is accordingly not present in preferred embodiments of machining installations, so that in these embodiments no separate measuring station is arranged in the workpiece flow between the machine for the machining with a geometrically defined cutting edge and the honing machine.

In the case of the claimed invention, not only is the "honing" production process used for setting the diameter tolerance, cylindrical shape and surface structure, but at the same time the honing can bring about an improvement in the coaxiality of the bore wherever required. Contributing to this is, on the one hand, the movement back and forth of the honing tool coaxially in relation to the bore axis and, on the other hand, the relatively high amount of material removal in comparison with conventional methods.

The workpiece is generally held in a workpiece position and the honing tool is introduced into the bore coaxially in relation to the desired position of the bore axis and moved within the bore. The workpiece is normally secured at least against being lifted off from the workpiece holder. In the case of some variants of the method, degrees of freedom of movement about a vertical axis may possibly be allowed, in order that no unwanted constraining forces can occur and align the workpiece on the honing tool. In the case of other variants, the workpiece is fixed for the honing in a workpiece position, for example by means of indexing devices, and thereby has a workpiece position that does not change even under the action of machining forces.

In order that the position of the bore axis is not changed by the honing when it has already been correctly set by the preceding operations, and in order that, possibly even due to material removal that is unevenly distributed axially and/or in the circumferential direction, the position can still be corrected and, in particular, the coaxiality can be further improved, in some embodiments exact fixing of the position of the tool axis (with respect to the spatial position and the angular position or orientation) is provided during the honing. This may be achieved by radial guidance of the honing tool. Structurally, this can be achieved by various radial guiding devices.

The honing tool is preferably rigidly coupled by a spindle-side coupling structure to a honing spindle, or to a drive rod that is rigidly coupled to the honing spindle, and is guided at least one bearing point arranged at an axial distance from the coupling structure, at least one cutting group of the honing tool being arranged between the coupling structure and the bearing point. The radial forces acting on this cutting group may consequently be accommodated on both sides of the cutting group, whereby the position of the tool axis in the region of the cutting group remains stable even under high transverse forces. Specifically in the case of axially long bores, for example with a length-diameter ratio of well over 3 or over 4 or over 5 or over 6, this type of rigid guidance of the axial movement has proven successful.

In some embodiments, an end portion of the honing tool away from the spindle is rotatably mounted on the outlet side, remote from the inlet side of the bore, in a counter-holder. This variant is possible in the case of all workpieces with a continuous bore. The counter-holder can be moved along with the honing tool when there is an axial reciprocating movement of the honing tool, to be precise either passively (without a displacement drive of its own) or actively (by means of a displacement drive). In the case of a counter-holder that is moved along with the tool, the chucking length of the honing tool between the spindle-side coupling structure and the counter-holder remains constant during the reciprocating movement, which may have a positive effect on the machining quality. It is also possible that the counter-holder is fixed at a position fixed in relation to the machine, so that the honing tool is moved in relation to the counter-holder during the reciprocating movements. Such embodiments are structurally particularly simple, since it is possible to dispense with linear guides and possibly a drive for the counter-holder. Variants with guiding points ahead and behind the bore (front and rear guides) and/or variants with inner guidance are likewise possible.

The crankshaft bearing bore is an example of a bore which is axially relatively long and has a number of bore portions that are arranged in line with one another and in series at a mutual distance from one another. In the case of such workpieces it is possible that at least one tool mounting for the honing tool lies between two adjacent bore portions. In some embodiments, such "inner guidance", i.e. a tool guiding device inside the workpiece, is provided between two adjacent bore portions, and consequently between the bore inlet and the bore outlet. The axial distance between the bearing points for the honing tool can in this way be kept short, whereby mounting or guidance that is particularly stable with respect to transverse forces can be achieved and bending of the honing tool between bearing points can be prevented or reduced.

In the case of a variant that is suitable for inner guidance, a tool mounting that serves as a guiding device has a bearing element which can be fixed in relation to the machine and on or in which a guiding element that is freely rotatable with respect to this bearing element is rotatably mounted, during operation rotates along with the led-through, rotating honing tool and guides and supports the latter against radial forces. The rotatable guiding element may have at least one driver element, which is intended for (circumferentially interlocking) engagement in a recess provided on the tool body of the honing tool, so that the guiding element can be configured in a simple and robust form as a passive element (without a drive of its own). On the inner circumference of the guiding element there may be provided axially continuous clearances, through which the cutting elements (for example honing sticks) attached to the honing tool can fit without any physical contact.

The inner guidance may also be advisable in conjunction with a group tool, in the case of which a number of cutting groups arranged at an axial distance from one another are arranged on a tool body for the simultaneous honing of a number of bore portions arranged at an axial distance from one another, the number of cutting groups preferably corresponding to the number of bore portions that are to be machined simultaneously. For example, a group tool for a four-cylinder in-line engine block may have five cutting groups for the five bearing points. An inner tool mounting may then act on the tool body between two cutting groups. Two or more inner tool mountings may be provided, for example one for each intermediate space between cutting groups.

As an alternative to radial guidance of the honing tool by external radial guiding devices, in some cases it may also be sufficient to couple the honing tool rigidly to the honing spindle or a correspondingly rigid drive rod and to design the entire arrangement rigidly enough that, at most, there can be a very small lateral deflection.

As far as the honing methods are concerned, a distinction can be drawn between classic honing and so-called mandrel honing. In classic honing, honing tools with cutting groups that can be adjusted radially during the honing are used, in order gradually to achieve the desired size of the bore that is wanted by means of a large number of strokes. In mandrel honing, on the other hand, a mandrel honing tool preset to a desired size (finished size) is used, usually having a conical cutting region and, adjoining that, a cylindrical calibrating region that likewise performs cutting. In the case of mandrel honing, the entire material-removing operation generally only requires one or a few double-strokes, for example a maximum of three. Both honing methods can be used within the scope of the present invention, alternatively or in combination.

A characteristic of the honing is the great removal of material in comparison with conventional honing, possibly also making it possible for the coaxiality to be corrected or improved. The removal of material actually required on the bore portions of the crankshaft bearing bore depends on the preparation, and may vary from bore portion to bore portion of a workpiece and from workpiece to workpiece of a series. Often a removal of at least 100 μm is produced, at least on one or more bore portions and/or workpieces of a series, it also being possible in particular for the amount of material removal to lie between 200 μm and 500 μm. In the case of workpieces or workpiece portions that have been prepared particularly well by means of geometrically defined cutting edges, the amount of material removal may also be less than 200 μm or less than 100 μm.

In order to make cost-effective finishing possible within short cycle times, in the case of some variants of the method material is removed during the high-power honing, at least in phases, by means of geometrically undefined cutting edges with a material removal rate $Q_W=V/t$ that is much greater than in the case of conventional honing. Here, V is the volume of the workpiece that is cut off by machining and t is the machining time required for this, resulting in [mm$^3$/s] as the dimension. The volume V is governed by the approximation $V \approx (\pi (D^2-d^2)L)/4$, where d is the (smaller) diameter of the bore before the removal, D is the (larger) diameter after the removal and L is the length of the machined bore or of the bore portion that has been increased in diameter.

To make the numerical values comparable, in this application the material removal rate is referred to a machining time t=20 s (corresponding to a typical honing time) and a length L=20 mm (corresponding to a typical web width of a single bearing web of a crankshaft bearing bore of a passenger car engine). The material removal rate normalized in this way is referred to in this application as the "specific" material removal rate and $Q_W^S$ for short.

If typical bores with nominal diameters from the range of 40 mm to 70 mm are now considered, the specific material removal rate is preferably over 13 mm³/s (for 40 mm) and over 22 mm³/s (for 70 mm). These typical lower limits are generally far exceeded. In the case of a nominal diameter of 40 mm, it may be for example that $Q_W^S$>30 mm³/s, occasionally also $Q_W^S$>50 mm³/s or even $Q_W^S$>100 mm³/s. In the case of a nominal diameter of 70 mm, it may be for example that $Q_W^S$>50 mm³/s, occasionally also $Q_W^S$>100 mm³/s or even $Q_W^S$>150 mm³/s.

Among the factors that are conducive to high material removal rates is unconventionally high cutting speeds, which in turn depend on the rotational speed (number of revolutions) and/or the reciprocating speed of the honing tool.

In the case of some variants of the method, the honing tool is rotated during high-power honing, at least in phases, with a number of revolutions of over 400 rpm, the number of revolutions preferably being, at least in phases, over 1000 rpm, in particular over 1500 rpm. Often, the number of revolutions lies in the range of 1500 rpm to 2500 rpm.

Alternatively or in addition, the honing tool may in the case of classic honing (with an expandable honing tool) be moved during high-power honing, at least in phases, at a maximum reciprocating speed of over 20 m/min, the maximum reciprocating speed preferably lying, at least in phases, between 30 m/min and 50 m/min or even over 50 m/min. In the case of mandrel honing (with a preset tool), maximum reciprocating speeds of over 12 m/min, in particular over 20 m/min, can be achieved.

The spindle drive of the honing machine is then correspondingly designed with regard to the maximum number of revolutions, maximum reciprocating speed and drive output.

A special design of the cutting means may help to achieve high material removal rates and other machining criteria. For example, it may be favourable to use relatively long cutting sticks. In the case of some embodiments, a honing tool which has a number of cutting sticks distributed about a tool body is used, the length of the cutting sticks being over 60%, in particular over 80%, of the axial bore length. Alternatively or in addition, the length of the cutting sticks may be over three times or over four times or over five times the effective diameter of the honing tool. For the machining of typical crankshaft bearing bores, for example with diameters in the range of 40 mm to 70 mm, the cutting stick length may, for example, lie at 200 mm or more, for example between 300 mm and 400 mm. When relatively long cutting sticks are used, large regions of the bore can be machined simultaneously when using honing tools with radially adjustable cutting sticks. When conical cutting sticks (mandrel honing) are used, a large change in diameter can be brought about in a single working stroke. Relatively long cutting sticks are generally also favourable with regard to the straightness of the bore produced.

In the honing, preferably relatively coarse-grained cutting means are used, in particular those with very hard cutting grains, for example with diamond cutting grains. Often, average grain sizes from the range between about 50 µm and about 150 µm (in the case of diamond sticks for example of D54 to D151) will be advantageous to obtain a good compromise between a high removal rate and at the same time a sufficiently fine surface structure of the machined inner surfaces after completion of the honing.

The honing is preferably carried out in a single stage. In the process chain there is then only a single honing operation, which completes the finishing. This allows the overall machining time to be kept short. Although multi-stage honing is possible, it is not generally required.

The final finishing operation, which immediately precedes the honing operation and in which a tool with one or more geometrically defined cutting edges is used, may take different forms depending on the overall process and on the workpiece.

In the case of some variants of the method, a reaming operation by means of a reaming tool is carried out as the final finishing operation with a geometrically defined cutting edge. The term "reaming" refers here to a chip-forming finishing method in which an existing bore that has a so-called reaming allowance is drilled out with the aid of a reaming tool. The reaming allowance is generally dimensioned such that, on the one hand, there is a minimum chip thickness but, on the other hand, there is not excessive chip removal, which could lead to an overloading of the reaming tool and/or of the workpiece. Since only a single chip-removing pass is carried out in reaming, the reaming allowance corresponds to the chip thickness or the cutting depth. This is typically relatively small and, for example in the case of variants of the method, may for example lie between 0.4 mm and 0.8 mm, depending on the material and the bore diameter. In individual cases, the amount of material removal may possibly also be less, for example only 0.2 mm, or more.

The reaming operation is also characterized in that the reaming tool is guided exactly in the already machined bore. For this purpose, one or more guiding elements or guiding portions are provided on the reaming tool. A reaming tool may be configured as a single-edged reaming tool, with only a single geometrically defined cutting edge, or as a multi-edged reaming tool, with two or more geometrically defined cutting edges.

Particularly advantageous are generally reaming tools on which different elements are provided for the material removal, i.e. for the machining function, and for the guiding function within the bore. For example, in addition to one or more tool cutting edges, one or more non-cutting guiding strips may be provided. This separation between machining tasks and guiding tasks allows the cutting edges of these tools to be easily exchanged and/or exactly set as and when required.

As an alternative to a reaming operation, a precision drilling operation with the aid of a precision drilling tool may be provided as the final finishing operation with a geometrically defined cutting edge. The amount of material removal is in this case preferably of the order of magnitude of the material removal of conventional semi-finishing operations, that is to say for example between about 0.4 mm and about 0.5 mm. In individual cases, the amount of material removal may possibly also be less, for example only 0.2 mm, or more in diameter.

The final finishing operation with a geometrically defined cutting edge may be designed as one-sided machining, in which the machining tool is only introduced from one side of the crankshaft bearing bore to be machined.

In the case of other variants of the method, on the other hand, the final finishing operation with a geometrically defined cutting edge is carried out as two-sided machining, a short tool which has a machining length that is shorter than the length of the crankshaft bearing bore being introduced from each end of the crankshaft bearing bore. The short tool is generally rigidly coupled to a machining spindle of the associated machine tool and, as a result of its small projection, is very stable with respect to transverse forces acting transversely in relation to the axis of rotation because of its compact length, and so no external guidance is necessary.

A short tool preferably has a machining length that lies between 50% and 80% of the length of the crankshaft bearing bore. Generally, not all bore portions are machined with a short tool, but at least half the bore portions. For example, in the case of a four-cylinder cylinder block with five bearing webs or bore portions, only three out of five or four out of five bearing webs can be machined in each case. In the case of an engine block for a three-cylinder motor, for example two or three out of a total of four bearing webs can be machined during the machining with a short tool introduced from one side.

When the short tool is chucked exactly coaxially in relation to the machining spindle and the axis of rotation of the machining spindle lies coaxially in relation to the desired position of the bore axis, then at least the end webs lying at the respective bore inlets are generally produced with an exact position, lying within the tolerances, by two-sided machining. Deviations from the exact position of the bore lying outside the tolerances may occur, if at all, in the case of bore portions that lie further inwards. Although these deviations contribute to impairment of the coaxiality, they can be reliably corrected by the subsequent honing operation.

Two-sided machining may be performed in various ways. For example, it is possible to provide two machine tools with mutually facing machining spindles, the axes of rotation of which extend coaxially. The crankshaft bearing bore of a workpiece positioned between the machining spindles may then be machined simultaneously from both sides.

In the case of other variants that may be advantageous, for reasons including cost, in the two-sided machining of the workpiece it is turned by 180° between a first machining (from the first end of the bore) and a second machining (from the opposite, second end of the bore). A single machining spindle arranged on one side is then sufficient here, the two machining operations then being carried out on the workpiece one after the other.

In the case of some variants of the method, the two-sided machining is designed as precision drilling, a precision drilling tool being used as the short tool.

In the case of other variants of the method, the two-sided machining is designed as a reaming operation, a reaming tool then being used as the short tool.

Since at least the positions of the end webs lying on the bore can generally be prescribed exactly within the tolerances in the case of two sided-machining, particularly in the case of this variant of the method the position of the crankshaft bearing bore can be ensured by a finishing operation with a geometrically defined cutting edge. The subsequent honing does not in this case have to be designed to be position-changing or position-correcting, but can be optimized for improving the coaxiality of the bore portion and maintaining the diameter tolerances and surface qualities.

As an alternative to two-sided machining, in the case of some variants of the method it is provided that the final finishing operation with a geometrically defined cutting edge is carried out by means of a group tool, on which a number of cutting groups arranged at an axial distance from one another are arranged on a tool body for the simultaneous machining of a number of bore portions of the crankshaft bearing bore that are arranged at an axial distance from one another. Normally, the number of cutting groups corresponds in this case to the number of bore portions to be machined simultaneously.

Each cutting group may have one or more geometrically defined cutting edges. Fixed and/or settable and/or adjustably controllable cutting edges may be provided.

Since, to correspond to the relatively great length of the crankshaft bearing bore, a group tool has a relatively great tool length with respect to its diameter, there is the risk of lateral deviation of the group tool. It is therefore provided in the case of preferred embodiments that an end portion of the group tool that is remote from the spindle is rotatably anchored in a counter-holder on an outlet side remote from the inlet side of the crankshaft bearing bore, the counter-holder preferably being moved along with the group tool when there is an axial reciprocating movement of the group tool.

In particular when using a counter-mounted group tool, the finishing by means of geometrically defined cutting edges can be used, possibly in a single machining operation, to machine the prepared crankshaft bearing bore to such an extent that, on the one hand, the generally necessary levelling after the assembly of the workpiece and, on the other hand, the finishing to an oversize suitable for honing removal can be carried out in a single machining operation.

In order to ensure that, after the machining with a group tool upon completion of the precision drilling, each of the bore portions has an undersize that can be reliably removed by the subsequent honing operation, when using a group tool there is preferably a following measuring operation in which each bore portion is checked separately for maintaining the starting parameters applicable to the subsequent honing operation (in particular diameter). It is in this way possible to avoid a situation in which, for example if there is a tool rupture in one of the cutting groups, there remains a bore portion with too small a diameter, which could lead to the honing tool and/or the workpiece being damaged when the honing tool is introduced. A simple check that it has been drilled may suffice.

The invention also relates to a machining installation suitable for carrying out the method, for the finishing of a crankshaft bearing bore in a cylinder crankcase of an internal combustion engine, with at least one machine tool with a machining spindle, to which a finishing tool with a geometrically defined cutting edge is coupled or can be coupled, and with a honing machine with a honing spindle which can be driven by a spindle drive and to which a honing tool is coupled or can be coupled. The machining installation is configured for carrying out the method described in this application.

The honing tool is preferably coupled or can be coupled rigidly to the honing spindle directly or by interposing a rigid drive rod and the bearing device is designed for acting on the honing tool at a bearing point arranged at an axial distance from a spindle-side coupling structure of the honing tool, in such a way that at least one cutting group or a portion of a cutting group of the honing tool is arranged between the coupling structure and the bearing point. A front guide and/or a rear guide and/or an inner guide may be provided.

The method could also be performed on a correspondingly designed machining centre.

The above and further features emerge not only from the claims but also from the description and the drawings, where the individual features can be realized in each case by themselves or as a plurality in the form of subcombinations in an embodiment of the invention and in other fields and constitute advantageous embodiments. The wording of all the claims is made the content of the description by reference. Preferred embodiments are explained on the basis of the appended drawings.

BRIEF DESCRIPTION OF THE DRAWINGS

FIG. 1 shows a schematic plan view of part of an embodiment of a machining installation for the finishing of crankshaft bearing bores in cylinder crankcases of internal combustion engines;

FIGS. 2B to 2D show various views of an engine block with a crankshaft bearing bore;

FIG. 3 shows a schematic side view of the machining of a crankshaft bearing bore with a mandrel honing tool countermounted at the end and having a conical cutting region;

FIG. 4 shows a schematic side view of an arrangement with a honing tool mounted in a front guide and a rear guide and fastened to the honing spindle by means of a drive rod;

FIGS. 5A and 5B show a schematic side and plan view of an arrangement with a honing tool which is rigidly coupled directly to the honing spindle, is equipped with continuous cutting sticks and is rotatably mounted inside the workpiece between adjacent bearing webs by means of an inner guide.

DETAILED DESCRIPTION OF PREFERRED EMBODIMENTS

Figure 2A:
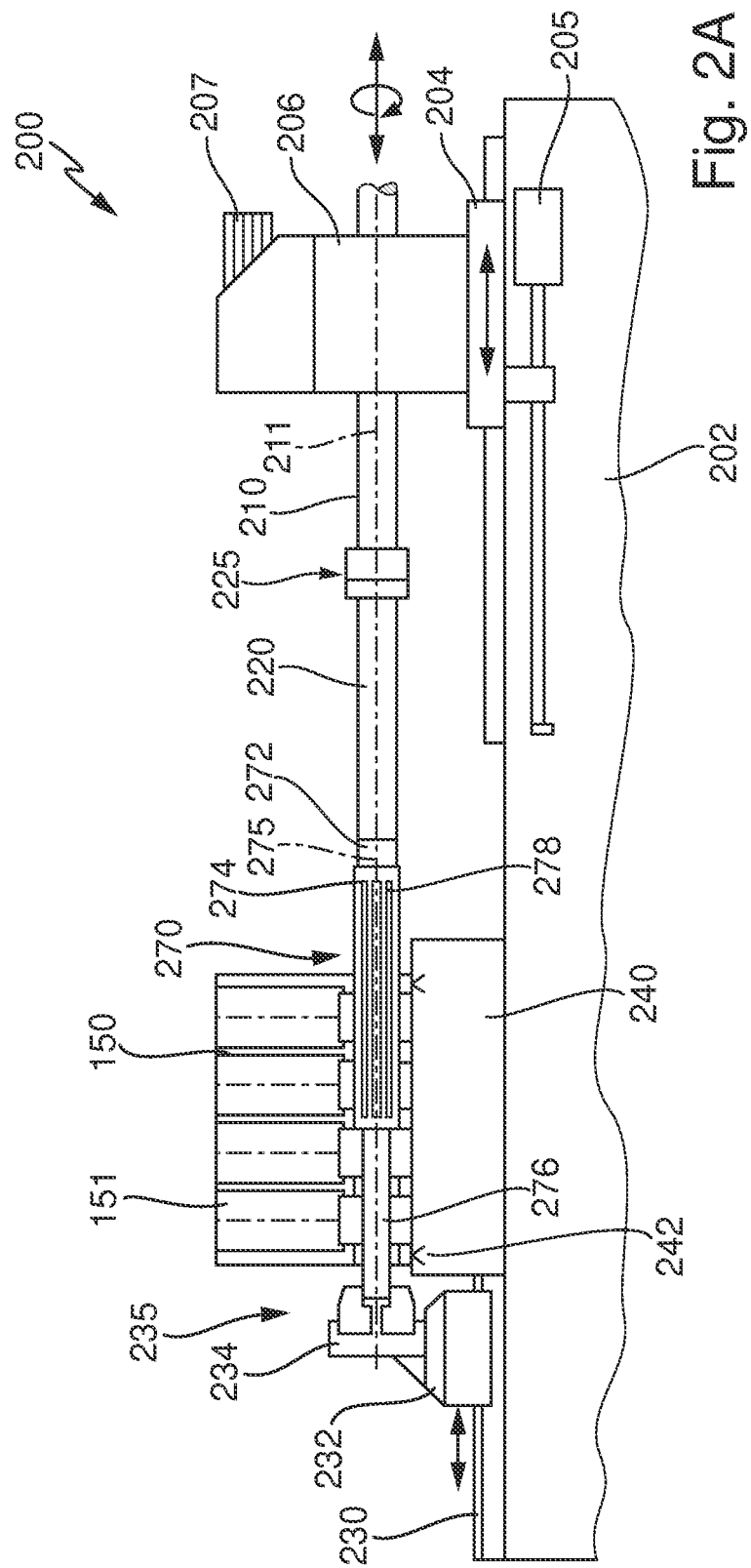
FIG. 2A shows a schematic side view of a horizontal honing machine for the honing of crankshaft bearing bores.

In FIG. 1 there is shown a schematic plan view of part of an embodiment of a machining installation 100 for the finishing of crankshaft bearing bores in cylinder crankcases of internal combustion engines. The entire machining installation, only part of which is represented here, is designed for complete finishing of the crankshaft bearing bore directly following the assembly of the individual parts of the engine block that form the crankshaft bearing bore.

In the case of the example, a workpiece 150 to be machined is a cylinder crankcase for an in-line four-cylinder engine. The detail shown of a production line for the complete machining of these workpieces shows a machine tool designed as a precision drilling machine, with a precision drilling device 120 and a honing machine, following in the direction of material flow 182, with a honing device 140. The precision drilling device 120 and the honing device 140 are provided here on separate machine beds, but they may also be arranged on a common machine bed. A transfer device 180 serves for transferring the workpieces in the direction of material flow 182.

The precision drilling device 120 comprises a precision drilling spindle 122, the rigidly guided spindle axis of which is substantially horizontally aligned. The precision drilling spindle can be moved horizontally and rotated about the spindle axis with the aid of a spindle drive 124. Rigidly coupled to the free end of the precision drilling spindle is a precision drilling tool 128, attached to the circumference of which is a cutting insert 129, consisting of hard metal, which serves as a drill tip or cutting edge.

The axial movement and the rotational movement of the precision drilling spindle and the adjustment of the cutting edge are controlled by means of a precision drilling control unit 126. In typical precision drilling operations, work is performed with numbers of revolutions of between about 1000 and about 3000 rpm and advancing rates of between about 200 and about 1400 m/min. Typical cutting depths (material removal) with respect to the diameter normally lie between 0.3 mm and 1 mm. Deviations from these typical parameter ranges are possible in exceptional cases.

With the aid of an adjusting device, the radial position of the cutting edge can be adjusted, and it is thereby possible inter alia to fix the diameter of the bore to be precision-drilled. The precision drilling tool therefore has one or more adjustably controllable cutting edges. The adjusting device may, for example, have a cone which is arranged inside the precision drilling tool and can be displaced axially by means of an adjusting rod guided by the precision drilling spindle 122. The sloping lateral surface of the cone acts on sloping inner sides of tool holders, which are guided radially displaceably in the body of the precision drilling tool and respectively carry an exchangeable cutting insert. By this arrangement, the radial position of the cutting edge 129, and with it the effective diameter of the precision drilling tool, can be changed continuously or in steps during the operation of the precision drilling device as a reaction to control signals of the precision drilling control unit 126. When there is tool wear, the cutting insert can be re-adjusted, so that there is no significant impairment of the quality of the bore, in particular of the bore diameter, in spite of tool wear (wear compensation).

The precision drilling spindle of the precision drilling unit 120 and the precision drilling tool fastened thereto are designed for carrying out position- and angle-determining semi-finishing. Typical amounts of material removal are over 0.4 mm (with respect to the diameter). In individual cases, smaller amounts of material removal, for example from 0.2 mm, may possibly also be provided. The precision drilling device shown is the last precision drilling station of the process chain immediately before the transfer of the workpieces to the honing device 140. Consequently, the final chip-forming finishing with a geometrically defined cutting edge is carried out on the precision drilling device 120.

In the workpiece flow before this precision drilling device there is only a single further precision drilling unit, that is to say a coarse drilling unit (not represented), which is designed for coarse machining (typical amounts of material removal of between 2 mm and 8 mm). The process may be designed such that, after completion of the final precision drilling, the bore has an undersize in the range of 100-400 µm, preferably in the range of 0.2 mm+/−0.05 mm in diameter.

The single-spindle honing device 140 has a honing unit 141. This has a horizontal honing spindle 142, which is driven by means of a spindle drive 144 such that, during the honing, the honing spindle performs horizontally oscillating working movements, on which a rotational movement about the horizontal axis of rotation is superimposed. A honing control unit 146 controls the working movements of the honing spindle.

Rigidly coupled to the free end of the honing spindle 142 is a honing tool 148, with which a honing operation on the precision-drilled crankshaft bearing bore can be carried out immediately following the final precision drilling operation after the transfer of the workpiece from the precision drilling device to the honing device.

With this honing following the transfer, a relatively high amount of material removal is achieved. With respect to the diameter of the bore, in typical processes an oversize of at least 80 µm is removed, the oversize removed by the honing often being over 100 µm. In many cases, the oversize removed by honing lies between about 80 µm and about 110 µm, possibly also up to 200 µm, rarely more.

No measuring step takes place between the final machining stage with geometrically defined cutting edges and the beginning of the honing, the workpiece is transferred directly to the honing machine.

In the following, various examples of structural and method-related variants of the honing are initially described.

In FIG. 2A there is shown a schematic side view of an embodiment of a horizontal honing machine 200, which can be used in the machining installation for the honing of crankshaft bearing bores.

The honing machine is designed such that, with the aid of the honing production process, the tolerances with respect to diameter, cylindrical shape and surface structure of the bearing points can be produced. Furthermore, if and when required, the coaxiality of the bore portions that are in line with one another can be improved.

Mounted on a machine bed 202 of the honing machine 200 is a horizontally movable spindle slide 204, which carries a headstock 206, in which the honing spindle 210 of the honing machine is rotatably mounted with a horizontal spindle axis 211. The electrical rotary drive 207 for the spindle rotation is mounted on the headstock. The reciprocating drive 205, required for the reciprocating movement parallel to the spindle axis 211, is mounted in the machine bed and drives a horizontally aligned threaded spindle on which a nut coupled with the spindle slide 204 runs.

The reciprocating drive is designed for maximum reciprocating speeds in the range of 40 m/min or 50 m/min or more, the rotary drive for maximum numbers of revolutions of approximately 2500 rpm to 3000 rpm. The available drive output for reciprocation and rotation is over 10 kW.

In the case of the example, the workpiece 150 to be machined is a cylinder crankcase for an in-line four-cylinder engine (cf. FIG. 2B to FIG. 2D). The workpiece is fixedly mounted on a workpiece holder 240, which is fastened to the upper side of the machine bed. With the aid of an adjusting drive that can be actuated by machine or manually, the workpiece holder can be moved horizontally in a horizontal direction (X direction) extending perpendicularly to the spindle axis 211 (Z axis). The workpiece lies with its planar oil-sump connecting surface 156 on the workpiece holder and is exactly positioned with the aid of indexing pins 242, so that the exact position of the workpiece in relation to the spindle axis 211 can be fixed by means of the position of the workpiece holder 240.

The oil-sump connecting surface 156 in the case of this setup serves as a production reference surface for fixing the system of coordinates that is fixed in relation to the workpiece in relation to the system of coordinates that is fixed in relation to the machine. In the case of other variants of the method, the already previously machined opposite top surface 154 (connecting surface for the cylinder head) serves as the production reference surface.

On the side of the workpiece holder that is remote from the spindle there is fastened on the machine bed a horizontal linear guiding device 230, which runs parallel to the spindle axis 211 and on which there runs a slide 232, which carries a bearing element 234 for a rotatable chuck 235, which is mounted in the bearing element rotatably about a horizontal axis extending coaxially in relation to the spindle axis 211. The horizontally movable, rotatable chuck 235 is provided as a counter-holder for the end of the honing tool that is remote from the spindle. In the case of the example, the slide 232 is mechanically forcibly coupled with the slide 204 of the reciprocating drive. It is also possible that the movement of the passive slide 232 is produced exclusively by means of the moved tool. In the case of another variant, the counter-holder has a drive of its own, which is synchronized with the reciprocating drive of the honing spindle.

The honing tool 270 is rigidly connected to the honing spindle 210 with the aid of a flexurally stiff drive rod 220. For this purpose, the releasable coupling structure 225 between the drive rod and the honing spindle is designed as a flexurally stiff rigid coupling structure for co-rotation, for example in the form of a screw connection or a simple flange connection. The releasable connection between the drive rod 220 and the honing tool 270 is also flexurally stiff and for co-rotation. For this purpose, the spindle-side coupling structure 272 of the honing tool may be formed for example as a screw thread, which interacts with a corresponding counter-thread at the tool-side end of the drive rod.

In other embodiments, the spindle-side coupling structure of the honing tool is fastened directly to the tool-side end of the honing spindle, so that working takes place without an interposed drive rod (cf. FIG. 5B).

The honing tool 270 has an elongated-cylindrical tool body 274, on which the spindle-side coupling structure 272 is formed on the spindle side and a cylindrical guiding shank 276 is formed on the side remote from the spindle. The tool axis 275 extending centrically in the tool body is coaxial with the spindle axis 211 as a result of the rigid coupling. Radially movably mounted carrying strips, which carry axially elongated cutting sticks 278 with a diamond cutting coating are seated in radial openings of the tool body. A radial adjustment of the cutting sticks of this expandable honing tool is performed with the aid of an interlocking adjustment system, which is not represented any more specifically, is driven electromotively or hydraulically and comprises an axially displaceable adjusting rod that runs through the honing spindle and the drive rod into the honing tool and arranged at the end of which is an expanding cone, which has single or multiple support and interacts with conical counter-surfaces on the inner sides of the carrying strips, in order to ensure when there is axial displacement of the adjusting rod a radial adjustment of the cutting sticks without the cutting sticks becoming tilted.

The length of the cutting sticks, measured parallel to the tool axis, is preferably over 60%, possibly even over 70%, and in the case of the example even somewhat over 80% of the length of the crankshaft bearing bore to be machined with the honing tool, which on the one hand is conducive to high rates of material removal and on the other hand has a favourable effect on the straightness of the bore or the coaxiality of the bearing webs.

In the machining configuration of the honing machine that is represented, the end of the guiding shank 276 that is remote from the spindle is clamped in the rotatable chuck 235. As a result, the single cutting group of the honing tool that is formed by the cutting sticks 276 is arranged between two bearing points stabilizing the position of the tool axis. One of the bearing points is formed by the mounting of the honing spindle 210 in the headstock 206, the opposite bearing point by the chuck 235, which is mounted on the slide 232, can be moved axially with the honing tool and serves as a counter-bearing.

Some special features of the workpiece 150 are explained on the basis of FIGS. 2B to D, 2B showing a longitudinal section, FIG. 2C showing a plan view parallel to the bore axis of the crankshaft bearing bore and FIG. 2D showing a plan view parallel to the bore axes of the cylinder bores. Very close tolerances apply in some respects to engine blocks and the functional surfaces and bores formed on them, it shall ensure a reliable function. The cylinder bores 151 are typically toleranced with respect to the cylindrical shape and diameter of the cylinder bore in the range of a few micrometers, particular attention also being devoted to the surface topography. Tolerances in the range of 100 μm typically apply to the distance ZA between the bore axes 150 of the cylinder bores, the so-called gauge.

The bearing points for the crankshaft in the region of the crankshaft bearing bore 160 have a somewhat greater dimensional tolerance than in the case of the cylinder bores. The crankshaft bearing bore is a relatively long bore in comparison with the cylinder bore (typical ratio of length to diameter at most 2.5), typically with a length-diameter ratio LDV that is much greater than 2.5 or 3 and in the case of the example is approximately 6. In the case of a four-cylinder in-line engine, the crankshaft bearing bore has five bore portions 161 to 165, which are arranged in line with one another in series at an axial distance from one another. The bore portions form the bearing points for the crankshaft. The coaxiality of these bearing points in relation to one another is particularly important in the case of the crankshaft mounting. The bearings are intended to lie in line as well as possible, in order that the crankshaft can run concentrically and rest uniformly at all the bearing points. The coaxiality of the individual bearing points should not exceed 15 μm, or not by much. For the definition of "coaxiality", reference is made to DIN ISO 1101, the content of which is to this extent made the content of this description.

A further important criterion with respect to the crankshaft bearing bore is the position of its bore axis 166, which defines the position of the crankshaft axis during the operation of the engine. The term "position of the bore axis" is intended here to comprise both the absolute spatial position of this axis and its angular position, i.e. spatial orientation. The vertical position may be defined, for example, by the distance ADA of the bore axis from the top surface 154 of the engine block at the bore inlet or at the bore outlet (or the corresponding distance AO from the oil-sump connecting surface 156). The distance between the crankshaft and the top surface is one of the criteria for the compression of the engine. Although tolerances in the micrometer range are generally not required here, tolerances in the range of a few one hundredths of a millimeter are desired. The exact position of the crankshaft or the bore axis of the crankshaft bearing bore in relation to the cylinder bores is also important for reducing wear on components that are subjected to high loading, which include not only the piston/piston pins, connecting rods and connecting rod bearings on the crankshaft but also the mountings of the crankshaft in the cylinder crankcase. The angular position of the bore axis 166, i.e. the orientation thereof with respect to a reference system that is fixed in relation to the workpiece, also plays a role here. The position of the bore axis 166 with respect to the overall bore length BL should typically vary by at most 0.05 mm, this value applying both to the vertical direction (direction of the top surface) and transversely thereto (horizontal direction in FIG. 2B).

With the aid of the honing machine 100, it is possible in the case of an engine block to finish the crankshaft bearing bore 160 by means of honing immediately after the final machining operation performed with a tool with a geometrically defined cutting edge, for example after a precision drilling operation or a reaming operation, in such a way that all the tolerances with regard to the coaxiality of the bore axis and also with regard to the required surface quality of the bearing points can be achieved. For this purpose, the following procedure can be followed.

Firstly, without an interim measuring operation, the cylinder crankcase 150 transferred from the precision drilling device is clamped onto the correctly positioned workpiece holder 140, which is of a torsionally very rigid configuration, with the aid of the indexing pins 142, in such a way that the spindle axis 111 of the honing spindle is coaxial with the desired position of the bore axis of the crankshaft bearing bore that is wanted. This axial position will generally not lie centrally, but eccentrically, at least with respect to some of the bore portions to be machined. Moreover, with respect to their desired diameter, the bore portions have an undersize, which has to be removed by honing. Depending on the quality of the preparation, the undersize may, for example, lie in the range of at least 0.1 mm.

After securely clamping the workpiece, the honing tool is introduced into the crankshaft bearing bore from the inlet side, towards the spindle, to such an extent that the end portion of the guiding shank 176 that is remote from the spindle can be introduced into the chuck 135 and securely clamped there. In this preparational phase, the cutting sticks are in their retracted position, so that the honing tool rigidly coupled to the honing spindle and the drive rod can be partially introduced into the crankshaft bearing bore by this without touching the inner sides of the bearing points in the crankshaft bearing bore.

After that, the reciprocating drive, the rotary drive and the drive of the adjusting system for expanding the cutting group is switched on. In order to to achieve a possibly considerable amount of material removal in relatively short cycle times, the maximum reciprocating speeds and the maximum numbers of revolutions are typically well above the corresponding values for conventional honing, as are customary for example when machining cylinder bores. Maximum reciprocating speeds may be over 20 m/min or over 30 m/min, up to for example approximately 40 m/min; the maximum numbers of revolutions, at least during a phase of honing, are typically over 1000 rpm or more, over 2500 rpm rarely being required.

At an advanced stage of expanding (increasing the diameter) of the honing tool, the most inwardly lying portions of the bearing points are then machined first by the rapidly rotating and rapidly axially oscillating honing tool, by the multi-edged cutting sticks. In the case of bore portions that are not completely centred (for example inner lying bearing webs), there may first be a one-sided partial cut, which gradually becomes a full cut over the overall circumference of a bore portion. In this way, all the bore portions are gradually provided with a cylindrical shape, centred in relation to the tool axis 175, so that the coaxiality of the bearing points improves.

The cutting speeds may lie in the range of 250 m/min or more, for example over 300 m/min or over 350 m/min or over 400 m/min. The achievable chip volume of the finishing, at least in the end phase when material is removed at all the bore portions, may be much greater here than in the case of conventional honing operations, for example in the range of over 200 mm³/s or even over 500 mm³/s or more.

In this application, a specific chip volume $Q_W^S = V/t$ [mm³/s] is taken as a basis for determining the chip volume, where V is the volume of the workpiece that is removed by machining and t is the machining time required for this. The volume V is governed by the approximation $V \approx (\pi(D^2-d^2)L)/4$, where d is the (smaller) diameter of the bore before the removal, D is the (larger) diameter after the removal and L is the length of the machined bore or of the bore portion that has been increased in diameter. The specific chip volume is referred or normalized here to a machining time t=20 s (corresponding to a typical honing time) and a length L=20 mm (corresponding to a typical web width of an individual bearing web of a crankshaft bearing bore of a passenger car engine). The values specified in table A (see end of the description) for the chip volume are specified for typical nominal bore diameters of 40 mm to 70 mm. In those columns in which the number of webs is equal to 1, the values correspond to the specific chip volume for the four different diameters.

For a typical crankshaft bearing bore of an in-line four-cylinder engine with a diameter of 60 mm and 5 bearing webs (bore portions), each with a length of 20 mm, there is for example a value of the chip volume of about 47 mm³/s (corresponding to an amount of material removal of 0.1 mm in diameter), and a value of 236 mm³/s corresponds to an amount of material removal of 0.5 mm.

Often achieved (total) chip volumes in crankshaft bearing bore machining with typical bore diameters of about 40 mm to about 70 mm lie in the range of about 60 mm$^3$/s to about 110 mm$^3$/s in the case of 5 bearing webs and an amount of material removal of about 0.2 mm. This is a significant increase in comparison with conventional honing methods.

The high drive output together with unconventionally high numbers of revolutions and reciprocating speeds allow a strong increase in the cutting speed in comparison with conventional honing. This allows the required amounts of material removal in the diameter to be achieved within customary honing times of, for example, 20 s to 25 s, which corresponds to a chip volume of well over 200 mm$^3$/s or even over 500 mm$^3$/s. The process parameters of the honing can consequently be set such that the honing times for the honing lie in the range of the honing times of the conventional honing of a crankshaft bearing bore, i.e. in the range of at most 20 to 25 seconds. Since, however, the honing makes it possible to dispense with the previously necessary preceding drilling operation, more rapid, and consequently more cost-effective, finishing of crankshaft bearing bores is possible with a quality that at least remains the same.

The honing regularly allows coaxialities of less than 30 μm or even less than 15 μm to be achieved. In cases of workpieces that have not been prepared sufficiently well, if for example only an accuracy of the bore axis position of significantly in excess of ±20 μm could be achieved by the machining carried out with defined cutting edges, active changing of the position of the bore axis of the crankshaft bearing bore could even be brought about, which however is not generally necessary.

In order to be able, for example, to correct the coaxiality as and when required, a rigid and precise machine concept is implemented on the honing machine. For instance, as far as the honing spindle is concerned, precise and stiff units that have little in common with corresponding units of traditional honing machines are provided by way of the slide guidance of the spindle up to acceptance of the workpiece. For example, the honing spindle on conventional honing machines is typically mounted with simple angular-contact ball bearings, not braced angular-contact ball bearings. By contrast, the mounting within the headstock 106 provides a more sophisticated mounting, which can be prestressed, that is to say a prestressable radial/axial bearing.

Furthermore, work is performed with comparatively long and slender honing tools, which during the machining of eccentrically lying bore portions are possibly exposed to high one-sided deflecting forces. Even under these aggravated conditions, the position of the tool axis remains stable coaxially in relation to the desired position of the bore axis, since on the spindle side the honing tool is rigidly connected to the honing spindle and on the side remote from the spindle it is counter-mounted on the counter-holder 135.

In the exemplary embodiment of FIG. 2A, a co-running counter-mounting is provided, moved along by the stroke of the spindle slide and therefore not requiring a drive of its own (passively driven counter-bearing). The stroke of the counter-mounting may, for example, lie in the range of 500 mm. Alternatively, a fixed counter-mounting may also be provided, for example in the form of a bearing block which is mounted fixedly on the machine bed and provided in which there is a cylindrical bearing opening which is arranged coaxially in relation to the spindle axis 211 and through which the cylindrical guiding shank 207 and 276 can be led without any play and with little friction as a result of hydrodynamic lubrication. A combination of an input-side front guidance and an output-side rear guidance is also possible (cf. FIG. 4).

The honing machine 200 is constructed as a horizontal machine, so that integration in automated production lines is particularly easy. The horizontal structure is also favourable for the accessibility of the machine components and with regard to the requirement for a structure that is relatively long in the axial direction as a result of the counter-mounting. A structure as a vertical machine, i.e. with a vertically aligned spindle axis, is however possible in principle.

The honing may in general be carried out in a single machining stage with a simply expanded honing tool. As a result of the required high rates of material removal, cutting sticks with diamond cutting grains are advantageous, but other hard cutting grain materials may possibly also be used, such as boron nitride. If work is performed with average grain sizes from the range between about 50 μm and about 100 μm to 150 μm, a good compromise can be achieved between a relatively high removal rate and a sufficiently low roughness of the finished inner surfaces, for which often only residual roughnesses of less than about 15 μm $R_z$ (average depth of roughness) are required.

In particular if low residual roughnesses are desired, work could also be performed in two successive stages of the honing, the second stage working with a finer grain size.

In the embodiment in FIG. 3, a honing tool 370 preset to a desired size (finished size) is used for the honing of a crankshaft bearing bore and is rigidly fastened directly to the honing spindle 310 without a rigid drive rod being interposed. In a way similar to in the embodiment of FIG. 2A, a cylindrical guiding pin 376 that is remote from the spindle is clamped in a rotatable chuck of a counter-holder 335 that can be passively moved along with the honing tool, in order to act against deflecting forces possibly acting from one side during the honing and to keep the position of the tool axis 375 always at the desired position of the bore axis that is wanted. The honing tool 370 has a relatively long conical cutting region 377 and, directly adjoining that on the spindle side, a substantially cylindrical cutting region 378, the outside diameter of which corresponds to the desired finished size of the bore portions. The diameter of the conical cutting region increases continuously from the front end, remote from the spindle, to the end towards the spindle, with a cone angle of several degrees.

Although the cutting sticks in the conical cutting region and in the calibrating region can be set manually before fitting into the honing machine, an adjustment during the honing operation is not envisaged and is also not necessary, so that it is possible to dispense with the structural expenditure for an adjustment system. Since the honing tool is exactly guided with regard to its axial movement by the rigid coupling to the honing spindle and the counter-holding on the side remote from the spindle outside the bore, the honing tool does not require possibly expandable guiding strips for support within the bore, so that the honing tool can have a relatively simple structural design.

While in the case of conventional honing with expandable honing tools, many double-strokes are required in conjunction with a gradual expansion of the honing tool, the overall material-removing operation when using such mandrel honing tools generally requires only one double-stroke or a few double-strokes. The axial reciprocating speed is typically less by a factor of 5 to 10 than in the case of corresponding honing methods with expandable honing tools. The axial reciprocating rates in the case of high-performance honing may, for example, lie in the range of 12 m/min or more. As a result of the high numbers of spindle revolutions, which in the case of this machining variant may be up to 2500 rpm or even up to 3000 rpm, in conjunction with the small reciprocating speed in relation thereto, the bore portions are gradually brought one after the other to the finished size, and at the same time possibly corrected with regard to their position, as the honing tool is pushed through, so that, after completion of one or two double-strokes, the actual position of all the bore portions coincides with the desired position prescribed by the tool axis 375, and the inner surfaces of the bore portions have the desired cylindrical shape and surface structure.

FIGS. 4 and 5 show further possibilities for guiding a honing tool that is relatively long in comparison with its diameter and has a long cutting stick region reliably and stably against transverse forces in a long bore, that is to say a crankshaft bore. In the embodiment of FIG. 4, the elongated honing tool 470 is connected to the honing spindle 410 by means of a limitedly flexible drive rod 420. On the sides of the cutting sticks 478 near the spindle and remote from the spindle, the substantially cylindrical tool body forms cylindrical guiding shanks, that is to say a guiding shank 476 remote from the spindle and a guiding shank 477 near the spindle, at the free end of which the coupling structure for coupling to the drive rod is seated. The guiding shank remote from the spindle is guided axially movably in a rear guiding bush 431, which is remote from the spindle and is arranged on the output side of the workpiece. The guiding shank 477 towards the spindle is guided axially movably in a sliding manner on the input side of the workpiece in a correspondingly designed front guiding bush 432. The centre axes of the guiding bushes fix the position and orientation of the tool axis, and consequently also the position and orientation of the finished crankshaft bearing bore. An end-side counter-holder is not required here.

In the embodiment of FIG. 5, the honing tool 570 equipped with continuous, long cutting sticks 578 is guided radially immovably and rotatably about the tool axis inside the workpiece between two axially adjacent bearing webs with the aid of a tool mounting 590. The "inner" tool mounting 590 that is shown in FIG. 5A in an axial section and in FIG. 5B in plan view has a plate-shaped bearing element 591, which is fastened to the upper side of the machine bed. Seated in a cylindrical opening of the bearing element is a substantially annular guiding element 592, which is mounted in an unlimitedly rotatable manner with the aid of an antifriction bearing with respect to the bearing element 591 that is fixed in relation to the machine. The guiding element 592 has an axially continuous guiding opening 593, adapted to the outside diameter of the honing tool, for leading through the honing tool. Provided over the circumference of the guiding element, on the inner side thereof, are a number of radial recesses 594, which are distributed uniformly over the circumference, the number of which corresponds to the number of cutting sticks and which are dimensioned such that, even when there is maximum expansion of the honing tool, the cutting sticks fit into the recesses without touching the guiding element. Fastened to the annular guiding element 592 is a driver element 595, which protrudes inwards over the inner circumference of the annular part of the guiding element into the otherwise largely circular passage opening 593. The inwardly protruding portion is dimensioned such that it fits, substantially without any play in the circumferential direction, into a longitudinal groove 579, which is provided on the tool body 574 of the honing tool and extends parallel to the tool axis over the entire length of the tool body centrally between two circumferentially adjacent cutting sticks.

Before the beginning of the honing, the honing tool 570 rigidly fastened directly to the honing spindle 510 is pushed from the input side into the crankshaft bearing bore and thereby initially passes with its guiding shank 576 remote from the spindle through the guiding opening 593 of the inner tool mounting 590. The relative rotational position of the honing tool and the rotatable guiding element 592 is thereby chosen such that the inwardly protruding portion of the driver element 595 is already threaded into the longitudinal groove 579 largely without any play in the region of the guiding shank remote from the spindle. As a result, it is ensured for the further introduction of the honing tool that the cutting sticks 578 can be fed through the guiding ring 592 without touching it. Once the honing tool has been introduced far enough, the free end of the guiding shank 576 is clamped into the counter-holder 535. During the honing, the honing tool moves back and forth in a way corresponding to the axial reciprocating movement in the guiding opening 593, while at the same time the annular guiding element is turned within the bearing element by the rotation of the honing tool by way of the driver element 595. This ensures reliable supporting of the honing tool within the workpiece, so that bending of the long honing tool is avoided to the greatest extent even under strong radial forces. Since the rotatable guiding element 592 is passive, i.e. does not have a drive of its own but is taken along by way of the movement of the honing tool, such a solution is relatively inexpensive and at the same time very robust and operationally reliable.

Such an "inner guide" that can be positioned in an intermediate space between axially adjacent bore portions may also be realized in other exemplary embodiments, for example the embodiment shown in FIG. 2A. Two or more inner guides may also be provided. It may perhaps be possible to dispense with an end-side counter-mounting, in particular if an inner guide is provided in the last end-side intermediate space between the bearing webs.

In the case of a variant of the method, it is also provided as a special feature that one or more indexing bores are finished on the workpiece clamped on the honing machine for the honing operation and fixed in the correct position, from that side that is intended for the later fastening of the transmission (transmission side) and/or on the opposite end side (control side). In addition to the honing spindle, on the honing machine there may be provided for this purpose, for example, two separate machining spindles, to which respectively a reaming tool may be rigidly coupled. Indexing bores for the positionally correct connection of the transmission or the connection of other components are conventionally produced after completion of the precision drilling and before the honing on the machine provided for the precision drilling. For this purpose, coarsely pre-machined bores that are already present on the workpiece are finished with a small positional tolerance (typically ±5/100 mm) with respect to the bore axis of the crankshaft bearing bore, for example by a reaming operation. This machining operation can then be shifted to the honing side, in order to carry out the finishing of the indexing bores and the honing in parallel in one and the same setup, either at the same time (in parallel) or one after the other. The indexing bores can consequently be finished with particularly high precision with respect to the alignment of the crankshaft bearing bore, since the workpiece no longer has to be re-clamped between the final material-removing machining operation on the crankshaft bearing bore (honing) and the finishing of the indexing bores.

The crankshaft bearing bore is a typical example of a relatively long bore, i.e. a bore with an axial length that is relatively great in comparison with the bore diameter. "Long bores" in the sense of this application typically have a length-diameter ratio LDV of much greater than 2.5 or 3, it being possible for LDV to be, for example, over 4 or over 6 or over 8. By contrast, "short bores", such as for example cylinder bores in combustion engines, have typical length-diameter ratios LDV of at most 2.5. The devices and methods described in this application are optimized particularly for the machining of long bores, but may in principle also be used in the case of short bores.

In the following, some examples of preferred variants of machining operations with the aid of tools with geometrically defined cutting edges are described.

Figure 6:
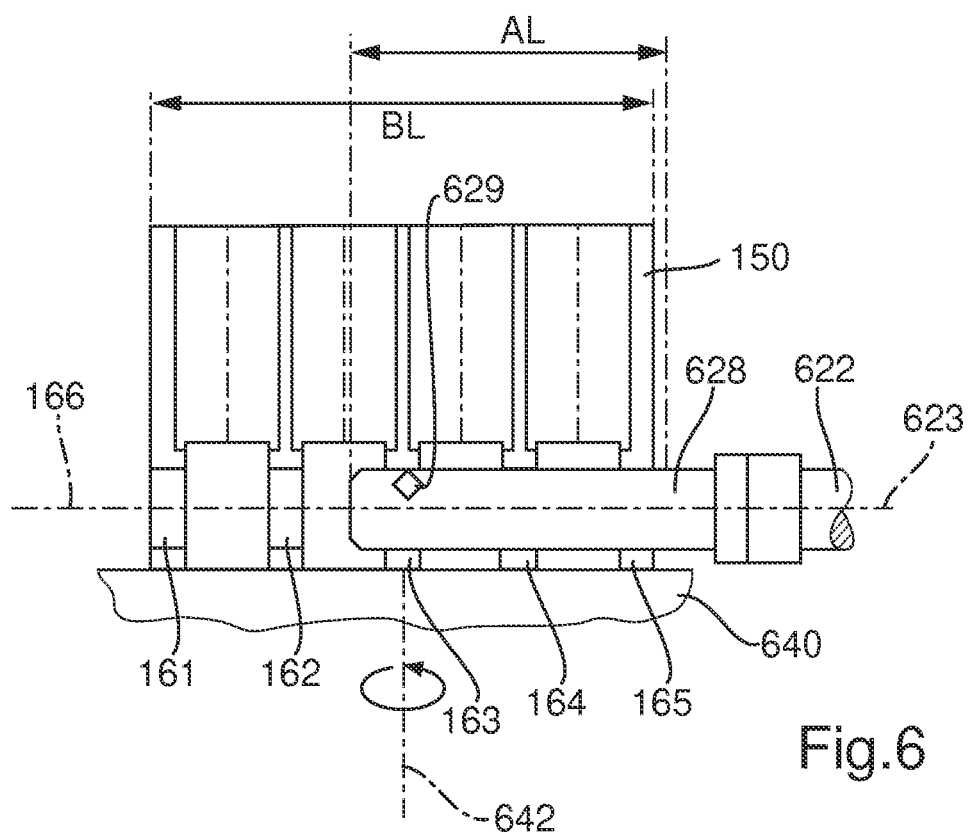
FIG. 6 shows an example of two-sided precision drilling directly before the honing operation.

FIG. 6 shows a cylinder crankcase 150, which is clamped on a workpiece holder 640, which can be rotated unlimitedly about a vertical workpiece holder axis of rotation 642, for the final finishing operation with a geometrically defined cutting edge. The workpiece is fixed in a prescribed position on the workpiece holder with the aid of indexing devices. The workpiece holder is part of a precision drilling device, which has a precision drilling spindle 622, the axis of rotation 623 of which extends horizontally and perpendicularly in relation to the tool holder axis of rotation 642. The precision drilling spindle can be moved horizontally and rotated about the spindle axis 623 with the aid of the spindle drive.

Rigidly coupled to the free end of the precision drilling spindle 622 is a precision drilling tool 628. One or more cutting inserts consisting of hard metal, of which only one cutting insert 629 is represented, are arranged on the circumference of the tool body of the precision drilling tool.

The precision drilling tool 628 is formed as a short tool, which has a machining length AL, which is much shorter than the bore length BL of the crankshaft bearing bore. In the case of the example, the machining length is about 60 to 70% of the bore length. As a result of the rigid coupling to the precision drilling spindle and the small projection, in this arrangement the precision drilling tool is very stable with respect to transverse forces and, when there is advancement parallel to the spindle axis 623, moves substantially coaxially in relation thereto, without any substantial lateral deflection taking place transversely in relation to the axis of rotation.

In the case of the cylinder block shown, for a four-cylinder in-line engine, the crankshaft bearing bore 160 has a total of five bore portions, which form the bearing points for the crankshaft, that is to say a first bore portion 161, a second bore portion 162, a third bore portion 163, a fourth bore portion 164 and a fifth bore portion 165.

In the two-sided machining that is shown by way of example, the workpiece 150 is initially brought into the first rotational position that is shown, in which the end of the bore with the fifth bore portion 165 is facing the precision drilling spindle 622. For the machining, the position of the workpiece is set such that the spindle axis 623 and the axis of rotation of the precision drilling tool in line therewith lie coaxially with the desired position of the bore axis 166. Then, the precision drilling tool is set in rotation and slowly advanced in the direction of the workpiece, so that, one after the other, first the fifth bore portion 165, then the fourth bore portion 164 and finally the third bore portion 162 are machined by means of precision drilling (the machining situation represented). The first two bore portions 161 and 162, on the side away from the spindle, remain unmachined in this machining stage.

Subsequently, the precision drilling tool is withdrawn from the bore and the workpiece is turned by 180° about the workpiece holder axis of rotation 642.

After that, the rotary tool is introduced from that side of the bore that begins with the first bore portion 161. The precision drilling tool is in this case advanced again coaxially in relation to the bore axis 166, until the first bore portion and the second bore portion have likewise been machined. After that, the precision drilling tool is withdrawn again from the bore and the two-sided machining operation is completed.

In this two-sided machining, at least the positions of the end-sided bore portions, that is to say of the first bore portion 161 and of the fifth bore portion 165, are regularly positioned with great accuracy precisely in relation to the desired position of the bore axis 166. As far as the further inwardly lying bore portions are concerned, small deviations may possibly be caused by the precision drilling tool being deflected somewhat to the side in the course of the axial advancement.

Since the "position of the bore axis" is determined by the position of the inlet-side and outlet-side bearing points, the position of the bore axis in the two-sided machining can be set exactly with great reliability. The coaxiality may possibly also lie outside the tolerances, because the inner lying webs are not yet in their exact position.

The coaxiality may be corrected by the subsequent honing operation, and consequently brought into the tolerance range.

In the case of the example shown in FIG. 6, the final finishing operation with geometrical cutting edges is designed in the manner of semi-finishing, with typical amounts of material removal of between 0.4 mm and 0.5 mm. The rest of the overall removal is then performed by honing.

Also when using a reaming tool for the final finishing operation with geometrically defined cutting edges, a corresponding two-sided machining may be advantageous, the short tool then being designed as a reaming tool, which is radially guided within the bore portion that has already been machined by reaming, by tool-side guiding elements.

In some embodiments, a corresponding two-sided machining with greater material removal is also provided in the case of a levelling operation preceding the final finishing operation with geometrically defined cutting edges, in which the crankshaft bearing bore is machined with a relatively high amount of material removal by means of geometrically defined cutting edges immediately after fitting of the bearing cover, that is to say after the preparation of the crankshaft bearing bore, in order to reduce possible irregularities resulting from the assembly. Typical maximum amounts of material removal of the levelling operation in preferred embodiments lie in the range between about 1 mm and about 2 mm, with respect to the diameter.

The various finishing operations mentioned here by way of example may be combined to form various process chains. In the case of one variant, a two-sided levelling operation first takes place with the aid of a suitably strongly removing precision drilling tool. As the final finishing operation with geometrically defined cutting edges before the transfer of the workpiece to the honing device, this is followed by the two-sided semi-finishing cut explained on the basis of FIG. 6. In the case of one variant of this method, a reaming tool with a guide is used instead of the precision drilling tool that is used for the semi-finishing cut. The transfer is followed in both variants by a honing operation, which is preferably performed as a mandrel honing operation (cf. FIG. 3 and the associated description).

In the case of another variant of the method, a levelling operation is carried out on a separate machine. For example depending on the cycle time, the levelling step may be carried out on a station of its own, with counter-mounted drilling rods, or combined with a semi-finishing operation with a counter-mounted drilling rod. If the levelling step is carried out on a separate machine, it may be followed, likewise on a separate machine, by a semi-finishing precision drilling operation with a counter-mounted precision drilling group tool, in which there is provided for each bore portion to be machined a cutting group of its own, with one or more geometrically defined cutting edges. Here, too, the transfer to the honing device is followed by a honing operation, which is preferably designed as a mandrel honing operation.

The finishing method and the devices used for it offer potential for considerable ways of shortening the process chain when finishing crankshaft bearing bores.

TABLE A

| | | Chip volume Qw [mm^3/s] | | | | | | | | | | | | | | | | | | | |
|---|---|---|---|---|---|---|---|---|---|---|---|---|---|---|---|---|---|---|---|---|---|
| | | Diameter [mm] | | | | | | | | | | | | | | | | | | | |
| | | 40 | | | | | 50 | | | | | 60 | | | | | 70 | | | | |
| | | Number of webs | | | | | | | | | | | | | | | | | | | |
| | | 1 | 3 | 4 | 5 | 7 | 1 | 3 | 4 | 5 | 7 | 1 | 3 | 4 | 5 | 7 | 1 | 3 | 4 | 5 | 7 |
| Removal of material in diameter [mm] | 0.08 | 5 | 15 | 20 | 25 | 35 | 6 | 19 | 25 | 31 | 44 | 8 | 23 | 30 | 38 | 53 | 9 | 26 | 35 | 44 | 62 |
| | 0.1 | 6 | 19 | 25 | 31 | 44 | 8 | 24 | 31 | 39 | 55 | 9 | 28 | 38 | 47 | 66 | 11 | 33 | 44 | 55 | 77 |
| | 0.2 | 13 | 38 | 50 | 63 | 88 | 16 | 47 | 63 | 79 | 110 | 19 | 57 | 75 | 94 | 132 | 22 | 66 | 88 | 110 | 154 |
| | 0.5 | 31 | 94 | 126 | 157 | 220 | 39 | 118 | 157 | 196 | 275 | 47 | 141 | 188 | 236 | 330 | 55 | 165 | 220 | 275 | 385 |

The invention claimed is:

1. A method for the finishing of a crankshaft bearing bore in a cylinder crankcase of an internal combustion engine, wherein a finished crankshaft bearing bore is produced with a prescribable desired size, a prescribable desired structure of the bore inner surface and a prescribable desired position of the bore axis, the method comprising the steps of:
  in a final finishing operation immediately preceding honing of a crankshaft bearing bore, removing an amount of material of at least 0.4 mm, using a finishing tool with a geometrically defined cutting edge; and
  then honing the crankshaft bearing bore, wherein a honing tool is introduced into the bore coaxially in relation to the desired position of the bore axis and moved within the bore, an amount of material of at least 0.08 mm being removed during the honing.

2. The method according to claim 1, wherein, after the final finishing operation, the workpiece is honed without an interim measuring operation.

3. The method according to claim 1, wherein the honing tool is radially guided during the honing, a radial guidance is achieved by
  (i) rigidly coupling the honing tool by a spindle-side coupling structure to a honing spindle, or to a drive rod that is rigidly coupled to the honing spindle, and guiding at at least one bearing point arranged at an axial distance from the coupling structure, at least one cutting group of the honing tool being arranged between the coupling structure and the bearing point,
  and/or
  (ii) rotatably mounting an end portion of the honing tool away from the spindle on an outlet side, remote from the inlet side of the bore, in a counter-holder, the counter-holder being moved along with the honing tool when there is an axial reciprocating movement of the honing tool,
  and/or
  (iii) the honing tool having a guiding portion near the spindle and a guiding portion away from the spindle, wherein the guiding portion near the spindle is guided axially movably on an input side of the workpiece in a front guiding device and the guiding portion away from the spindle being guided axially movably in a rear guiding device away from the spindle, arranged on the output side of the workpiece,
  and/or
  (iv) guiding and supporting the honing tool against radial forces at at least one position between two adjacent bore portions.

4. The method according to claim 1, wherein the workpiece is fixed in a workpiece position and the honing tool is introduced into the bore coaxially in relation to the desired position of the bore axis and moved within the bore.

5. The method according to claim 1, wherein an amount of material removal of at least 100 μm is produced during the honing on one or more bore portions.

6. The method according to claim 5, wherein the amount of material removed during the honing on one or more bore portions is between 100 μm and 200 μm.

7. The method according to claim 1, wherein, during the honing, at least in phases, material is removed by machining with a specific chip volume of over 13 mm$^3$/s.

8. The method according to claim 7, wherein the specific chip volume is over 20 mm$^3$/S.

9. The method according to claim 1, wherein the honing tool is rotated during the honing, at least in phases, with a number of revolutions of over 400 rpm, and/or wherein the honing tool is moved during the honing, at least in phases, at a maximum reciprocating speed of over 12 m/min.

10. The method according to claim 9, wherein the number of revolutions of the honing tool is, at least in phases, over 1000 rpm.

11. The method according to claim 10, wherein the number of revolutions of the honing tool is, at least in phases, over 1500 rpm.

12. The method according to claim 9, wherein the honing tool is moved during the honing, at least in phases, at a maximum reciprocating speed of over 20 m/min.

13. The method according to claim 12, wherein the honing tool is moved during the honing, at least in phases, at a maximum reciprocating speed of between 30 m/min and 40 m/min.

14. The method according to claim 1, wherein a honing tool which has a number of cutting sticks distributed about a tool body is used in the honing, and the length of the cutting sticks is over three times the effective diameter of the honing tool and/or wherein a honing tool with cutting means which have average grain sizes from the range between about 50 μm and about 150 μm is used in the honing operation.

15. The method according to claim 1, wherein a reaming operation using a reaming tool or a precision drilling operation using a precision drilling tool is carried out as the final finishing operation with a geometrically defined cutting edge.

16. The method according to claim 1, wherein the final finishing operation with a geometrically defined cutting edge is designed as two-sided machining, a short tool which has a machining length that is shorter than the length of the crankshaft bearing bore being introduced from each end of the crankshaft bearing bore, wherein in the two-sided machining the workpiece is turned between a first machining and a second machining with the short tool.

17. The method according to claim 16, wherein the workpiece is turned by 180° between the first machining and the second machining.

18. The method according to claim 16, wherein the short tool is a precision drilling tool or a reaming tool.

19. The method according to claim 1, wherein the final finishing operation with a geometrically defined cutting edge is carried out by means of a group tool, wherein a number of cutting groups arranged at an axial distance from one another are arranged on a tool body for the simultaneous machining of a number of bore portions of the crankshaft bearing bore that are arranged at an axial distance from one another, an end portion of the group tool that is remote from the spindle preferably being rotatably mounted in a counter-holder on an outlet side remote from the inlet side of the crankshaft bearing bore, the counter-holder being moved along with the group tool particularly when there is an axial reciprocating movement of the group tool.

* * * * *